United States Patent [19]

Liu

[11] 4,207,370

[45] Jun. 10, 1980

[54] METHOD OF PRODUCING CONTOUR MAPPED AND PSEUDO-COLORED VERSIONS OF BLACK AND WHITE PHOTOGRAPHS

[75] Inventor: Hua-Kuang Liu, Tuscaloosa, Ala.

[73] Assignee: Lumin Inc., Tuscaloosa, Ala.

[21] Appl. No.: 716,380

[22] Filed: Aug. 23, 1976

[51] Int. Cl.[2] .............................................. G03B 27/32

[52] U.S. Cl. ...................................... 428/204; 355/77; 428/29; 428/409; 428/542; 350/162 SF

[58] Field of Search ..................... 355/19, 77, 132, 95, 355/2; 350/162 SF, 320; 428/204, 29, 409, 542

[56] References Cited

U.S. PATENT DOCUMENTS

| | | | |
|---|---|---|---|
| 3,586,434 | 6/1971 | Mueller | 355/2 |
| 3,748,019 | 7/1973 | Bestenreiner et al. | 350/162 SF |
| 3,809,478 | 5/1974 | Talbot | 350/162 SF |
| 3,829,688 | 8/1974 | Barrett | 350/162 SF |
| 4,019,817 | 4/1977 | Matsumoto | 355/132 |

*Primary Examiner*—Richard A. Wintercorn

*Attorney, Agent, or Firm*—Harry E. Aine; Harvey G. Lowhurst

[57] ABSTRACT

A method of making multilevel equidensity contour mappings and pseudo-colored versions of a photograph. First a half-tone transparency of the photograph is made by the method described in copending patent application entitled "Method of Making Half-Tone Screens", Ser. No. 708,539 filed 26 July, 1976 by Liu, now abandoned. The half-tone photograph transparency is placed at the object plane of a first lens. A spatially filtered collimated light beam is directed through the transparency and the lens such that a multitude of diffraction orders appear in the focal plane of the lens. A particular non-zero order of diffraction is singled out by placing a thin slit spatial filter at the Fourier plane of the lens. Reimaging of the diffraction order by another lens produces a filtered image which contains multilevel equidensity contours of the original photographic image. In one embodiment the light beam is generated by lasers of different wavelengths. A colored version of the photograph results from the mixing of high-diffraction order outputs.

14 Claims, 6 Drawing Figures

METHOD OF PRODUCING CONTOUR MAPPED AND PSEUDO-COLORED VERSIONS OF BLACK AND WHITE PHOTOGRAPHS

CROSS-REFERENCE TO RELATED APPLICATIONS

The present invention utilizes half-tone screens produced in accordance with the method described in copending patent application entitled "Method of Making Half-Tone Screens", Ser. No. 708,539 filed July 26, 1976 by Liu, and now abandoned, which application is incorporated herein by reference.

BACKGROUND OF THE INVENTION

1. Field of the Invention

The invention relates to photographic reproduction and more particularly to a method of making a variety of multilevel equidensity contour mappings and pseudo-colored versions of a black and white photograph.

2. Description of the Prior Art

Equidensity contour mapping is important in the art of optical data processing such as tomography (i.e., the diagnostic views of X-ray photographs), pattern recognition, and image enhancement. Prior photographic techniques producing a single multilevel equidensity contour mapping of a photograph required many steps, which depend heavily upon film characteristics and therefore produced results which tend to be inaccurate and uncontrollable. More accurate techniques, such as digital optical processing, require very expensive equipment such as a microdensitometer in combination with a digital computer. While these results tend to be much more accurate and controllable they are too expensive to meet the needs of most users.

It is therefore an object of this invention to provide a method for making a variety of high quality equidensity contour mappings of a photograph by means of a simple photographic step.

From research results in optometry, it has been concluded that the human visual system can discriminate simultaneously only 15 to 20 gray levels from a complex black and white image. However, if the same image is presented in full color, the visually distinguishable levels can be increased enormously, up to hundreds or even thousands of different levels. Because of this increased resolution, techniques have been developed to encode color on black and white images such as radiographic, radioisotope scanning, and electron microscopic images. This encoding enhances the possibility of recognition or detection of the details of the images. The mapping of the black and white intensities into the three primary colors, i.e., blue, green, and red, is called pseudo-color encoding.

In the past, a pseudo-color encoding has been achieved mainly through two methods: a sophisticated digital method and a relatively simpler photographic method. The digital method involves the use of a flying-spot scanner, computations for intensity-to-color assignment, and output-color production. The sequential point-wise readings of the original black and white image, and the control and evaluation of the luminance and the chromaticity of the output image are assisted by a digital computer. The method is highly flexible but is also quite expensive. The photographic method, on the other hand, using only an incoherent light source, is much less expensive. Three photographic masks of different densities are made which are able to transform selectively the original gray levels into the three primary colors. The masks are used for the purpose of isolating the intensity levels in the black and white picture. The technique of producing the masks, especially the green mask, demands an accurate control of the gamma of the film and therefore requires several photographic steps.

It is therefore a further object of the invention to provide a method of encoding color onto a black and white image.

SUMMARY OF THE INVENTION

Briefly, the above objects are accomplished in accordance with the invention by utilizing a one-dimensional half-tone screen produced in accordance with the method described in the above-identified copending patent application. A half-tone copy of a photograph is made by contact printing with the half-tone screen and the photograph in conjunction with a high contrast photographic negative film. The result of this printing is a transparency carrying the modified half-tone image of the image on the photograph. The transparency is then placed in the object plane of a first lens. A spatially filtered collimated light beam is directed through the transparency such that a multitude of diffraction orders appear in the focal plane of the first lens. A particular non-zero order of diffraction is singled out by placing a thin slit spatial filter at the Fourier plane of the first lens. Reimaging of the diffraction order by a second lens is accomplished by placing the second lens such that the Fourier plane lies in the object plane of the second lens. The result is a filtered image at the output plane of the second lens. A reproduction of the image is a contour mapping of the original photograph.

The invention has the advantage that a variety of high quality equidensity contour mappings and color encoding of a photograph can be made through only one simple photographic step by the use of relatively inexpensive equipment.

In accordance with another aspect of the invention, pseudo-coloring of the transparency is achieved by using two or more lasers of different wavelengths as the light source. The coloring is achieved by mixing the high-diffraction order outputs generated by the lasers.

This method is the first pseudo-color encoding in a coherent optical system. The method is simple because once the half-tone screen is made, only one photographic hard-clipping process is required, no digital computer and microdensitometer scans are required, as used in the existing digital method; and fewer photographic processes are required as compared with the purely incoherent photographic process. In addition, the method has the advantage of operating speed; large data handling capacity; and flexibility, because its output can be varied with simple adjustments of the laser powers and different orders can be colored and mixed freely.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

The first step in the production of contour mappings or color encoding of an original photograph is to produce a half-tone transparency from an original photograph. This is accomplished by utilizing a half-tone screen generated in accordance with the method described in the above-identified copending patent application. A contact print of the original photograph is made through a half-tone screen on a high-gamma (high contrast) copying film transparency. An incoherent light source which has an average power density p on the film plane is used to expose the transparency. The exposure of the film for a time interval $\tau$ produces an exposure defined by the following equation:

$$E(x,y)=p\tau 10^{[-D(X)-D_P(X,Y)]} \qquad \text{Eq. 1}$$

Where D(X) and $D_P(X,Y)$ are the density distributions of the half-tone screen and the continuous tone original photograph, respectively. The copying film has a threshold level $E_t$ such that after the development of the exposed film the transmittance of the film will be a binary type function. Assuming that the gamma of the film is very large, the transmittance of the film may be written as follows:

$$T(x,y)=1,\ E(x,y)<E_t$$

$$T(x,y)=0,\ E(x,y)\leqq E_t \qquad \text{Eq. 2}$$

The above equation indicates that the original photograph is spatially modulated. This modulated reproduction of the original photograph will be referred to as the half-tone photograph transparency.

By controlling the exposure level, $p\tau$ in Equation 1, a variety of half-tone photographic transparencies having different opaque line widths will result. The maximum number of different widths of any half-tone photographic transparency cannot exceed the number of gray levels of the half-tone screen used.

Contour Mapping

Contour mappings are generated by the following procedure, after the half-tone photograph transparency has developed.

Figure 1:
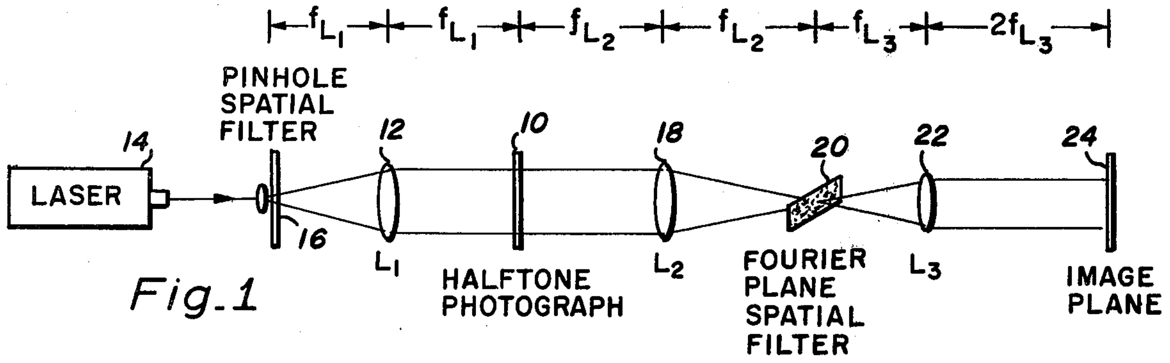
FIG. 1 is a diagram of a first embodiment of a coherent optical data processing system for use in practicing the method of the present invention.

Referring now to FIG. 1, the half-tone photographic transparency 10 is placed at the input plane of a coherent optical data processing system comprised of a lens element 12, a laser light source 14, and a conventional pin-hole spatial filter 16. The laser light is first spatially filtered by the pin-hole filter 16 and collimated by the lens 12. A second lens 18 is provided and placed such that the half-tone photograph transparency 10 is located at the object plane of the lens 18. This lens produces a multitude of diffraction order from the quasi-periodic input which appear in the focal plane of the lens 18. Particular orders of diffraction are singled out at the Fourier planes of the lens 18 by a translatable thin slit spatial filter 20. The output of the filter 20 is reimaged by a third lens 22 producing a filtered image at the focal plane 24. This image can be reproduced by any well known photographic or optical reproduction technique.

If the wavelength and geometrical factors are omitted for clarity, the $n^{th}$ order output intensity at the Fourier plane is as follows:

$$I_n\left(\frac{b}{a}\right) = \left(\frac{1}{n\pi}\sin\frac{n\pi b}{a}\right)^2 \qquad \text{Eq. 3}$$

and the normalized $n^{th}$ order output may be written as:

$$\bar{I}_n\left(\frac{b}{a}\right) = n^2\pi^2 I_n\left(\frac{b}{a}\right) = \left(\sin^2\frac{n\pi b}{a}\right)^2 \qquad \text{Eq. 4}$$

where $n\geqq 1$ and b is the width of the opaque lines $b/a\leqq$. The zero order output may be written as:

$$I_o = \left(1-\frac{b}{a}\right)^2 \qquad \text{Eq. 5}$$

Equations 3 and 5 are derived using the assumption that an infinite number of periodic opaque lines of width b and period a are present in the object plane.

Equation 3 indicates that there are at most n equal maxima and n equal minima in the $n^{th}$ order output, hence it will take a half-tone mask with at least 2n equal width gray levels to produce a half-tone picture of a given photograph that will yield a maximum of n bright contour lines. For the same half-tone picture, other diffraction orders also generate contours of constant brightness, but these contours generally correspond to different brightness levels. These levels are illustrated by reference to FIG. 2. The assumption is that all of the outputs are separately recorded by high contrast film with an exposure threshold.

Figure 2:
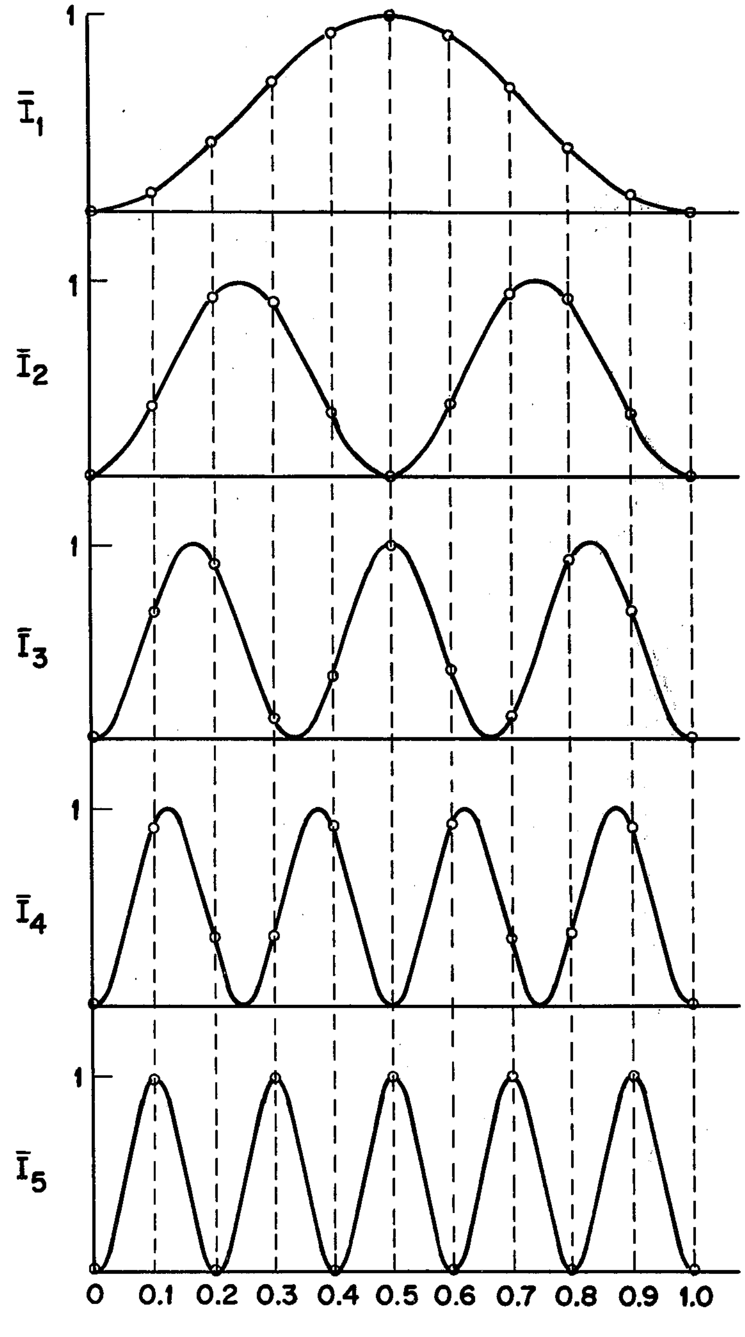
FIG. 2 is a graphic depiction of the normalized outputs of the first through the fifth diffraction order of an image produced in accordance with the method of the present invention.

In FIG. 2, normalized outputs of $\bar{I}_1$–$\bar{I}_5$, as given by Equation 4 are plotted. In this example, it is assumed that a half-tone photograph is made with a half-tone screen of ten gray levels and with a properly chosen exposure level. Such a photograph would have opaque bars of ten different widths, namely b equals 0.1a, 0.2a, 0.3a, . . . , 0.9a, and a. The possible output intensity levels corresponding to these widths are marked by the dots on the curves in FIG. 1. It is only the output $\bar{I}_5$ which has five equi-intensity zones. $\bar{I}_1$–$\bar{I}_4$ create brightness contours with a maximum of one to four contours, respectively. If all of the outputs are separately recorded by a high contrast film with an exposure threshold below the minimum non-zero output intensity level, a variety of multilevel, equidensity mappings of the original photograph are obtained.

Figure 3:
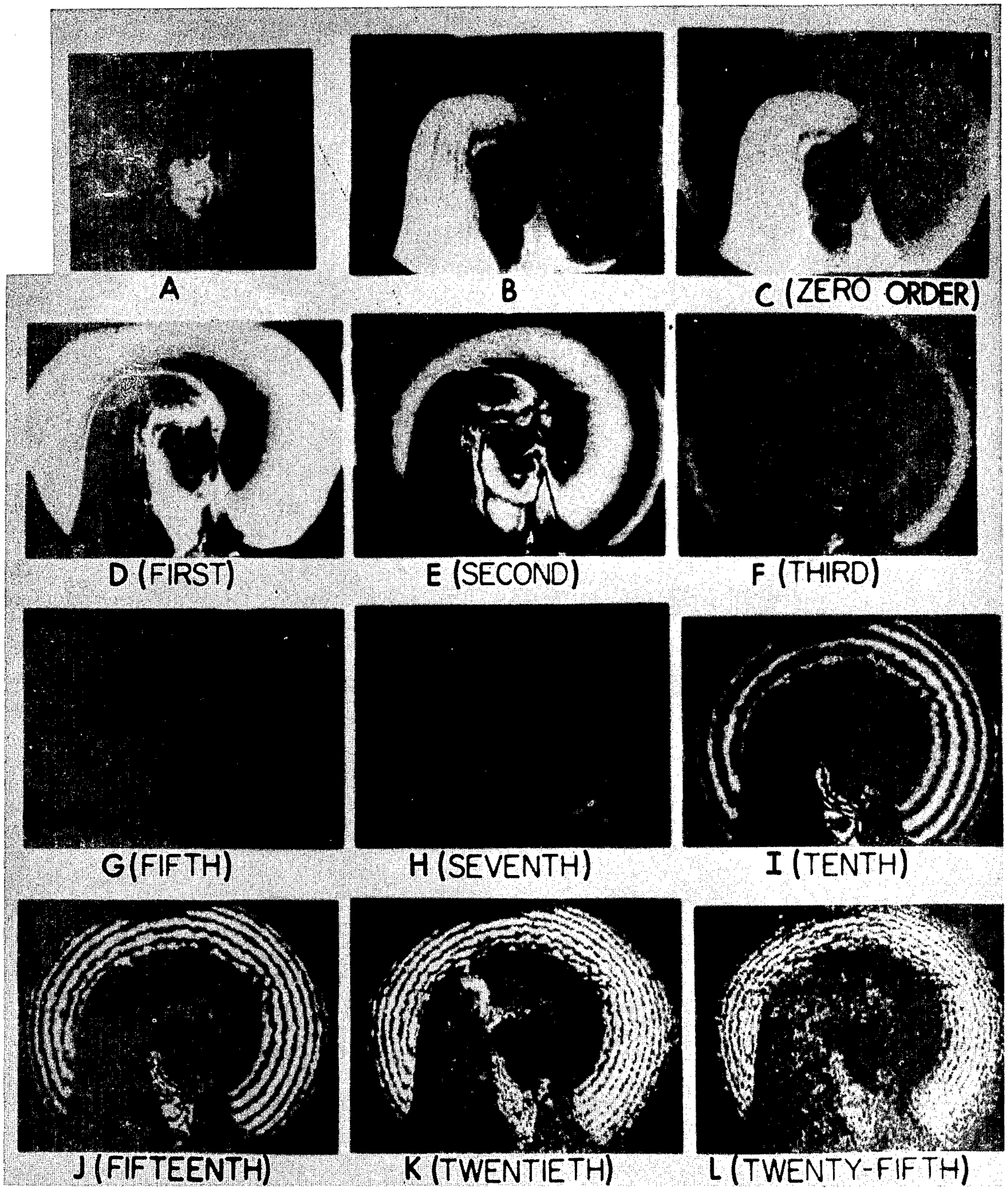
FIG. 3 is a reproduction of an original photograph (FIG. 3A), its half-tone photograph (FIG. 3B) and the image outputs of various diffraction orders (FIGS. 3C–L)
Figure 4:
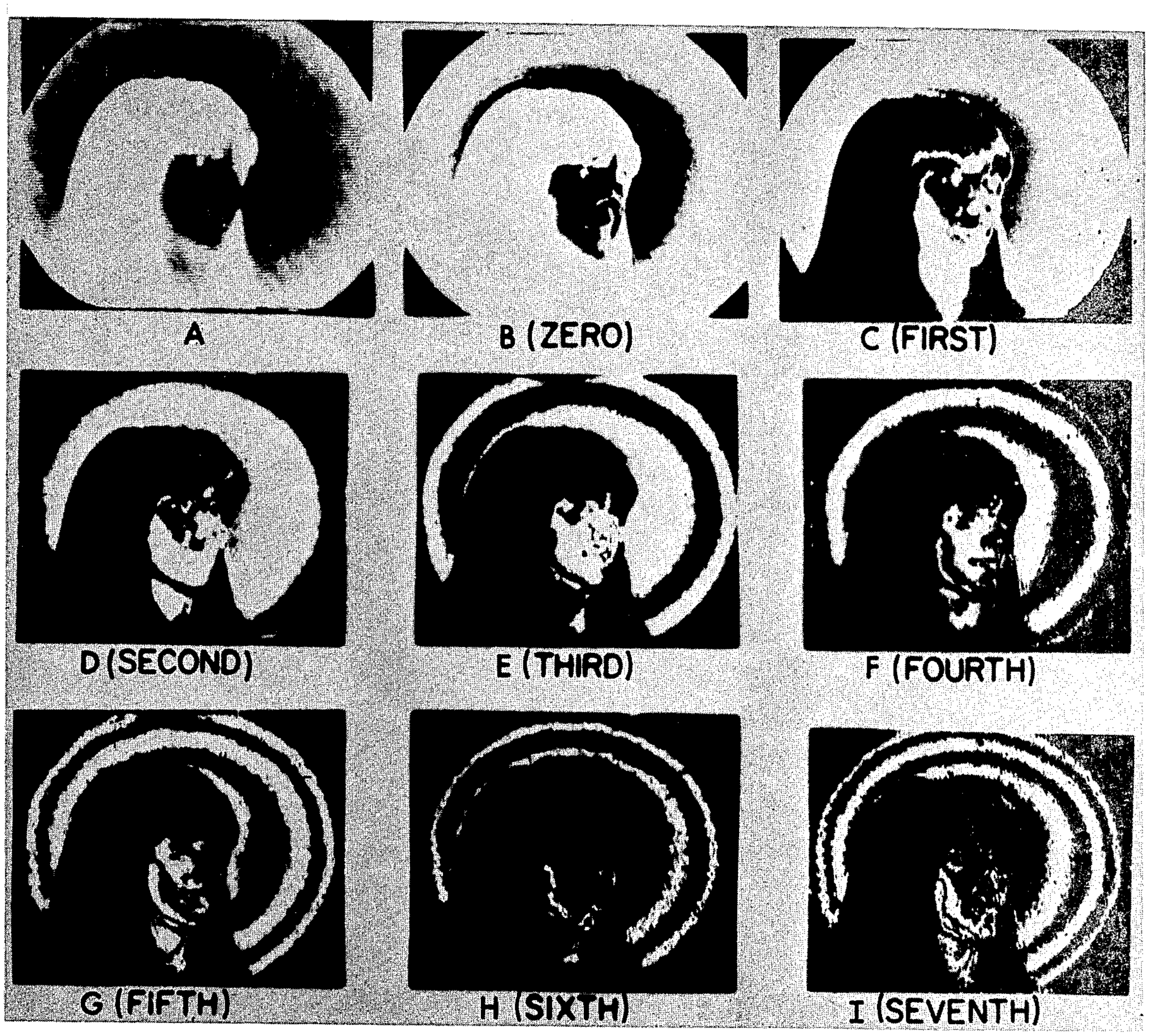
FIG. 4 is a reproduction of a half-tone photograph (FIG. 4A) and the image outputs of the zero through seventh diffraction orders (FIGS. 4B–I)

Examples of experimental results of applying this method are shown in FIGS. 3 and 4, which illustrate actual photographs of contour mappings produced in accordance with the present invention.

As described in the above-identified copending patent application, half-tone screens with different gray levels can be fabricated. One of these screens, having twenty levels, was used to make the half-tone photographs shown in FIGS. 3 and 4. Kodak Kodalith copying film was used for the hard clipping process. An extremely high gamma was achieved by normal development times and Kodak Kodalith developer.

The resulting half-tone photograph was then placed in the optical filtering system as shown in FIG. 1 and images produced by various individual diffraction orders were produced at the image plane 24. The original photograph, the corresponding half-tone photograph A, and its various filtered outputs from zero through the twenty-fifth order, are shown in FIG. 3. This illustrates that the background develops up to nine or more equidensity contours as the output order increases. The face and neck portions of the girl are also divided into different equal density regions, and contour lines in the second order output are particularly visible. As the order gets higher, it can be seen that the detail of the hair of the girl develops. The number of equidensity contours does not increase beyond the twentieth order because there are only twenty gray levels in the half-tone screen. Hence, twenty is the maximum number of widths normally present in the half-tone photograph.

In FIG. 4 a half-tone photograph which is clipped at a lower level is illustrated. Relatively fewer number of contours are visible at the higher order outputs, which can be seen by comparing for example the seventh order output shown in FIG. 4 with the seventh order output shown in FIG. 3.

Pseudo-Color Encoding

The basic principle of the pseudo-color encoding process is selective mixing of the colored outputs of the high diffraction orders of a half-tone photograph or transparency in a coherent optical system. In the pseudo-color process the one-dimensional half-tone screen described above is used. This half-tone screen has multiple gray levels. The one-dimensional half-tone transparency produced from contact printing with the half-tone screen and the original picture in the hard-clipping process consist of arrays of opaque bars spaced by transparent regions. The density and widths of these bars are spatially modulated by the original image; in addition they are determined by the characteristics of the half-tone screen and the exposure threshold of the hard-clipping film.

In the following analysis of the half-tone photographs in the coherent optical system, it is assumed that the spatial frequency of the half-tone screen is much higher than the maximum spatial frequency content of the image to be processed. Under this condition, the amplitude transmittance, t(x), at any region of the one-dimensional half-tone photograph can be approximated by an infinite pulse train of period a and pulse width b:

$$t(x)=\delta(x-na)*\mathrm{rect}\ x/b \qquad \text{Eq. 6}$$

where * denotes the convolution operation, δ(x) is a dirac delta function and $$\mathrm{rect}(x)=\begin{cases}1, & |x|\leq\tfrac{1}{2}\\ 0, & \text{otherwise.}\end{cases} \qquad \text{Eq. 7}$$

In Eq. 6 the parameter a is fixed by the half-tone screen used but b≦a will vary according to the exposure threshold in making the half-tone photograph, the density of the original picture, and the gray levels in the half-tone screen.

It is readily shown that the Fourier plane intensities for unit intensity input incident on the half-tone transparency may be expressed by:

$$I_n=\left(\frac{b}{\lambda f}\right)^2\mathrm{sinc}^2\left(\frac{n\pi b}{a}\right)=\frac{1}{\lambda^2 f^2}\,\frac{a^2}{n^2\pi^2}\,\sin^2\frac{n\pi b}{a} \qquad \text{Eq. 8}$$

where λ is the wavelength of the laser, f is the focal length of the imaging lens, and n denotes a nonzero positive integer representing the order of diffraction.

In the coherent optical system, lasers of the three primary colors, blue (B), green (G), and red (R), are used, with their wavelengths respectively denoted by $\lambda_B$, $\lambda_G$, and $\lambda_R$, and collimated beam intensities expressed by $I_B$, $I_G$, and $I_R$. For each color, any desired diffraction order may be selected, and the three resulting color images can be recorded on a color film, or displayed simultaneously on a screen or by means of a color television monitor. If l, m, and n denote the selected diffraction orders, the total intensity at a particular location of the output image, corresponding to the region where periodic opaque bars of width (a−b) are found in the half-tone photograph, may be given by $$I_T=\left\{\frac{I_B a^2}{\lambda_B^2 f^2}\,\frac{1}{l^2\pi^2}\sin^2\frac{l\pi b}{a}\right\}+\left\{\frac{I_G a^2}{\lambda_G^2 f^2}\,\frac{1}{m^2\pi^2}\sin^2\frac{m\pi b}{a}\right\}+\left\{\frac{I_R a^2}{\lambda_R^2 f^2}\,\frac{1}{n^2\pi^2}\sin^2\frac{n\pi b}{a}\right\}=\{I_{Bl}\}+\{I_{Gm}\}+\{I_{Rn}\}, \qquad \text{Eq. 9}$$

where $$I_{Bl}\equiv\frac{I_B}{\lambda_B^2 f^2}\,\frac{a^2}{l^2\pi^2}\sin^2\frac{l\pi b}{a}, \qquad \text{Eq. 10}$$

$$I_{Gm}\equiv\frac{I_G}{\lambda_G^2 f^2}\,\frac{a^2}{m^2\pi^2}\sin^2\frac{m\pi b}{a}, \text{ and} \qquad \text{Eq. 11}$$

$$I_{Rn}\equiv\frac{I_R}{\lambda_R^2 f^2}\,\frac{a^2}{n^2\pi^2}\sin^2\frac{n\pi b}{a}. \qquad \text{Eq. 12}$$

Figure 6:
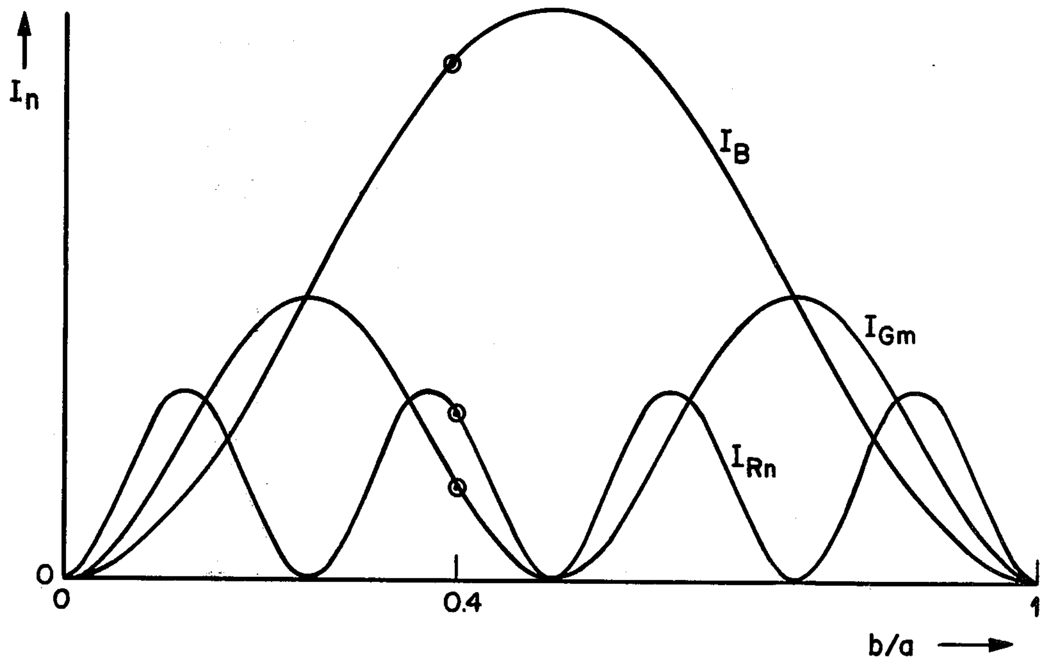
FIG. 6 is a graphic depiction of color intensity outputs.

To illustrate the meanings of Eqs. 10, 11, and 12 graphically, the functions $I_{Bl}$, $I_{Gm}$, and $I_{Rn}$ are plotted with respect to b/a(0≦b/a≦1) in FIG. 6 for l=1, m=2, n=4, and prechosen values of $I_B$, $I_G$, and $I_R$. A particular value of b/a=0.4 and its corresponding output intensities are marked as an example to show that the intensities of the three primary colors can be determined from these curves for a given region of the original picture. The net color, as a result of the mixture of these primaries, can be determined from a CIE chromaticity diagram. The mixing of the three primaries does not have to be limited to the one-color-one-order assignment as given in Eq. 9. Any number of diffraction orders may be assigned to any color and different laser intensities may also be easily controlled by attenuators. This pseudo-color encoder has considerable flexibility.

Figure 5:
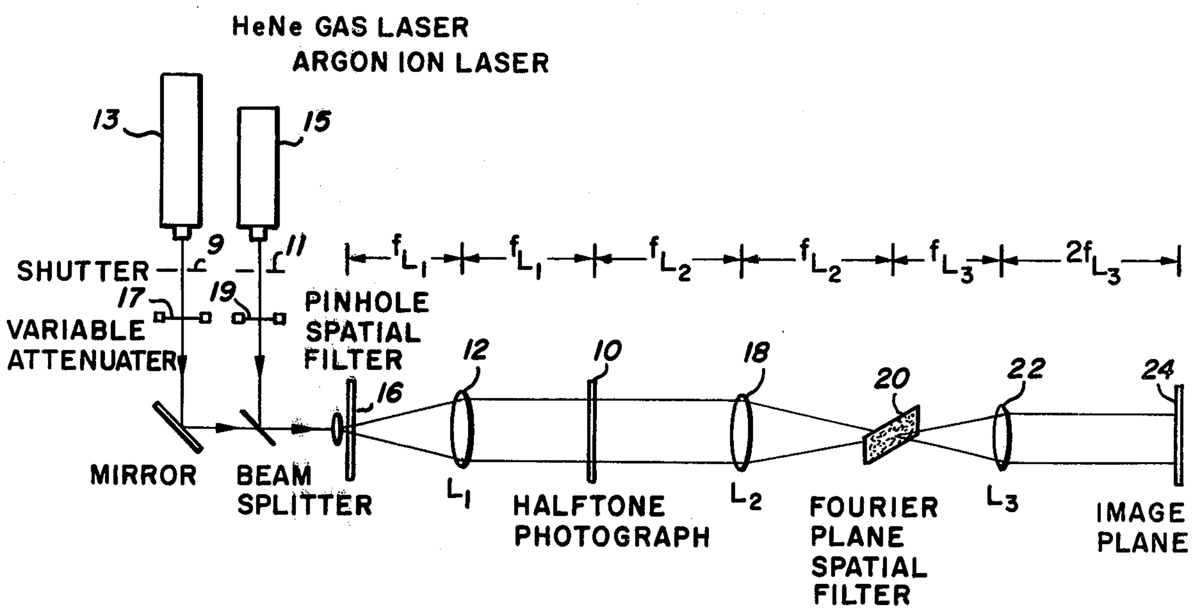
FIG. 5 is a diagram of a second embodiment of a coherent optical data processing system.

The coherent optical system used for the production of the pseudo-color photographs is shown in FIG. 5. Two lasers 13, 15, such as a 2-watt Spectra Physics Model 165 Argon laser and a 50-mW Spectra Physics He-Ne laser, may be used as the light sources. Each laser is controlled by a shutter (9,11) and an attenuator (17,19) so that their intensities are adjustable and also can be turned on or off independently. The beams from the two lasers are combined and aligned to form a mixed single beam leaving the lens $L_1$. The half-tone photograph is positioned behind lens $L_1$. The spatial filtering is performed at the Fourier plane by a thin slit spatial filter 20. This filter is mounted on an x-y translation stage, hence it can selectively pass any diffraction order. The different orders required for the two colors are selected sequentially, although with the appropriate use of color filters and two slits, the desired orders can be simultaneously transmitted. A lens $L_3$ is used to form an image 24 from the selected orders.

It is important to note that instead of the lasers (FIG. 1, 14, FIG. 5; 13 and 15) as the coherent light sources being used, incoherent light sources such as a mercury arc lamp or any similar incoherent point light source may be used. A single color filter may be used at the filter plane (FIG. 1; 20) for the contour generation. Color filters of the three primary colors may be incorporated at the location of the Fourier plane (FIG. 5; 20) to create the colored diffraction outputs for the mixing and pseudo-color production.

Futhermore, two dimensional half-tone screens produced by the method of the copending patent may be used to produce half-tone photograph transparencies for the contour mapping and pseudo-coloring. These transparencies may be placed at 10 in the system described by FIGS. 1 and 5 and a two-dimensional spatial filter (FIGS. 1 and 5, 20) should be used to perform the contour mapping and pseudo-color encoding.

While the invention has been particularly shown and described with reference to a preferred embodiment thereof, it will be understood by those skilled in the art that various changes in form and detail may be made therein without departing from the spirit and scope of the invention.

What is claimed is:

1. The method of making multilevel equidensity contour mappings of an original photograph, comprising the steps of:

a. exposing a light sensitive film through a mask of periodic equal width opaque straight bars, for a first predetermined period of time;
b. changing the relative translational position of said film and said mask such that said mask is offset in a direction perpendicular to said bars and by an effective distance which is less than the distance between any two bars;
c. exposing said film through said mask for a second predetermined period of time;
d. repeatedly exposing and changing the position of said film and said mask until the total distance traversed is equal to the distance between any of said two bars;
e. developing said film to thereby produce a half-tone screen;
f. contact printing on a high contrast photographic negative film, said original photograph through said half-tone screen to thereby produce a half-tone transparency of said original photograph;
g. placing said transparency at the object plane of a first lens;
h. directing a spatially filtered collimated light through said transparency, such that a multitude of diffraction orders appear in the focal plane of said first lens;
i. singling out a particular order of diffraction by placing a thin slit spatial filter at the Fourier plane of said first lens; and
j. reimaging said particular order by a second lens to thereby produce a filtered image at the focal plane of said second lens.

2. The method of making a pseudo-colored version of a photograph, comprising the steps of:

a. exposing a light sensitive film through a mask of periodic opaque straight bars, for a first predetermined period of time;
b. changing the relative translational position of said film and said mask such that said mask is offset in a direction perpendicular to said bars and by an effective distance which is less than the distance between any two bars;
c. exposing said film through said mask for a second predetermined period of time;
d. repeatedly exposing and changing the position of said film and said mask until the total distance traversed is equal to the distance between any of said two bars;
e. developing said film to thereby produce a half-tone screen;
f. contact printing on a high contrast photographic negative film, said original photograph through said half-tone screen to thereby produce a half-tone transparency of said original photograph;
g. placing said transparency at the object plane of a first lens;
h. directing a spatially filtered collimated mixed light beam from at least two colored light sources through said transparency, such that a diffraction order for each color appears in the focal plane of said first lens;
i. singling out a particular order of diffraction by placing a thin slit spatial filter at the Fourier plane of said first lens; and
j. reimaging said particular order by a second lens to thereby produce a filtered image at the focal plane of said second lens.

3. The method of making multilevel equidensity contour mappings of an original photograph, comprising the steps of:

a. exposing a light sensitive film through a mask of periodic equal width opaque straight bars, for a first predetermined period of time;
b. changing the relative translational position of said film and said mask such that said film and mask are offset by an effective distance which is less than the distance between any two bars;
c. exposing said film through said mask for a second predetermined period of time;
d. repeatedly exposing and changing the position of said film and said mask until a predermined total distance is traversed;
e. developing said film to thereby produce a half-tone screen;
f. utilizing said half-tone screen to produce a half-tone transparency of said original photograph;

g. directing a spatially filtered collimated light through said transparency, such that a multitude of diffraction orders appear;

h. singling out a particular order of diffraction by means of a filter; and i. reimaging said particular order to produce a filtered image.

4. The method of making multilevel equidensity contour mappings of an original photograph, comprising the steps of:

a. exposing a light sensitive film through a mask of periodic equal width opaque straight bars, for a first predetermined period of time;

b. changing the relative translational position of said film and said mask such that said film and mask are offset by an effective distance which is less than the distance between any two bars;

c. exposing said film through said mask for a second predetermined period of time;

d. repeatedly exposing and changing the position of said film and said mask until a predetermined total distance is traversed;

e. developing said film to thereby produce a half-tone screen;

f. utilizing said half-tone screen to produce a half-tone transparency of said original photograph;

g. directing a spatially filtered collimated light through said transparency, such that a multitude of diffraction orders appear;

h. singling out a particular order of diffraction by means of a filter; and i. reimaging said particular order to thereby produce a filtered image.

5. The method of claim 4 wherein step (g) comprises the steps of:

i. directing a spatially filtered collimated mixed light beam from at least two colored light sources through said transparency, such that a diffraction order for each color appears;

j. singling out a particular order of diffraction by means of a filter; and k. reimaging said particular order to thereby produce a filtered image.

6. The method of making a pseudo-colored version of a photograph, comprising the steps of:

a. exposing a light sensitive film through a mask of periodic opaque straight bars, for a first predetermined period of time;

b. changing the relative translational position of said film and said mask such that said film and mask are offset by an effective distance which is less than the distance between any two bars;

c. exposing said film through said mask for a second predetermined period of time;

d. repeatedly exposing and changing the position of said film and said mask until a predetermined total distance is traversed;

e. developing said film to thereby produce a half-tone screen;

f. utilizing said half-tone screen to produce a half-tone transparency of said original photograph;

g. directing a spatially filtered collimated mixed light beam from at least two colored light sources through said transparency, such that a diffraction order for each color appears;

h. singling out a particular order of diffraction by means of a filter; and i. reimaging said particular order to thereby produce a filtered image.

7. In an optical method of making multilevel equidensity contour mappings of a photograph, the steps of:

a. exposing a light sensing medium to the image of said photograph through a half-tone screen to produce a half-tone image of said photograph;

b. illuminating said half-tone image of said photograph with coherent or monochromatic light;

c. focusing the resulting illuminated image at a focal plane to produce a diffraction pattern image having a finite number of diffraction orders;

d. filtering the diffraction image pattern for selecting one of the diffraction order portions of the diffraction image pattern; and e. reimaging said filter selected diffraction order portion of said image pattern to produce said contour map of said photograph.

8. The method of claim 7 wherein step a. comprises the step of:

contact printing, on a high contrast photographic film, said original photograph through said half-tone screen to produce a half-tone image transparency of said original photograph.

9. The method of claim 8 wherein step b. comprises the steps of:

f. placing said transparency at the object plane of a first lens; and g. directing coherent or monochromatic light through said transparency such that a multitude of diffraction orders appear in the focal plane of said first lens.

10. In a method of making a pseudo-colored version of the photograph, the steps of:

a. exposing a light sensing medium to the image of said photograph through a half-tone screen to produce a half-tone image of said photograph;

b. illuminating said half-tone image of said photograph with coherent or monochromatic light of different first and second wavelengths;

c. focusing the resulting illuminated image at a focal plane to produce a diffraction pattern image having a finite number of diffraction orders and such that a diffraction order pattern for each of said first and second different wavelengths is obtained at said focal plane;

d. filtering the diffraction image pattern for selecting one of the diffraction order portions of the diffraction image pattern for each of said first and second wavelengths; and e. reimaging said filter selected diffraction order portions of the image pattern to produce an image of said photograph corresponding to each of said first and second wavelengths.

11. The method of claim 10 wherein step a. comprises the step of:

contact printing, on a high contrast photographic film, said original photograph through said half-tone screen to produce a half-tone image transparency of said original photograph.

12. The method of claim 11 wherein step b. comprises the steps of:

f. placing said transparency at the object plane of a first lens; and g. directing coherent or monochromatic light through said transparency such that a multitude of diffraction orders appear in the focal plane of said first lens for each of said first and second wavelengths.

13. The product made by the method of claim 7.

14. The product made by the method of claim 10.

* * * * *